United States Patent
Okamoto et al.

(10) Patent No.: US 8,259,988 B2
(45) Date of Patent: *Sep. 4, 2012

(54) IMAGE PROCESSING SYSTEM, INFORMATION PROCESSING DEVICE, AND COMPUTER PROGRAM

(75) Inventors: Yuji Okamoto, Kyoto (JP); Katsuyoshi Fujiwara, Osaka (JP); Naofumi Ueda, Kyoto (JP); Tatsuo Nomura, Kyoto (JP); Syouichirou Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1392 days.

This patent is subject to a terminal disclaimer.

(21) Appl. No.: 10/544,020

(22) PCT Filed: Jan. 28, 2004

(86) PCT No.: PCT/JP2004/000782
§ 371 (c)(1),
(2), (4) Date: Jul. 29, 2005

(87) PCT Pub. No.: WO2004/068333
PCT Pub. Date: Aug. 12, 2004

(65) Prior Publication Data
US 2006/0245004 A1    Nov. 2, 2006

(30) Foreign Application Priority Data
Jan. 29, 2003    (JP) .................................. 2003-020771

(51) Int. Cl.
*G06K 9/00* (2006.01)
(52) U.S. Cl. ........................................ 382/100; 283/113
(58) Field of Classification Search .................. 382/100; 713/176; 283/113; 358/3.28
See application file for complete search history.

(56) References Cited

U.S. PATENT DOCUMENTS
5,528,374 A    6/1996    Matias et al.
(Continued)

FOREIGN PATENT DOCUMENTS
JP    59-50660    3/1984
(Continued)

OTHER PUBLICATIONS
International Search Report (Form PCT/ISA/210) Apr. 2004, including a 1 page Japanese version and a 1-page English version.
(Continued)

*Primary Examiner* — John Strege
(74) *Attorney, Agent, or Firm* — Edwards Wildman Palmer LLP; George W. Neuner (57) ABSTRACT

It is an object to provide an image processing system, an information processing apparatus and a computer program, capable of utilizing a data protection function possessed by the image processing apparatus. The information processing apparatus connected to a communication network together with one or more image processing apparatuses acquires from each of the image processing apparatuses a protection function information which indicates whether or not an image processing apparatus has a data protection function for protecting data by encrypting or the like, and intensity information representing an intensity of data protection of the data protection function. The information processing apparatus outputs a list of the image processing apparatuses together with a key mark and security level representing the intensity of data protection in numeral about each image processing apparatus having the data protection function so as to accept selection of the image processing apparatus by which an image is processed.

15 Claims, 8 Drawing Sheets

U.S. PATENT DOCUMENTS

| | | | |
|---|---|---|---|
| 5,715,403 A * | 2/1998 | Stefik | 705/44 |
| 6,717,689 B1 * | 4/2004 | Endo et al. | 358/1.15 |
| 7,110,541 B1 * | 9/2006 | Lunt et al. | 380/51 |
| 2003/0196091 A1 * | 10/2003 | Raley et al. | 713/176 |
| 2004/0098591 A1 * | 5/2004 | Fahrny | 713/176 |

FOREIGN PATENT DOCUMENTS

| | | |
|---|---|---|
| JP | 2000-187564 | 7/2000 |
| JP | 2001-256027 | 9/2001 |
| JP | 2001-306273 | 11/2001 |
| JP | 2003-337687 | 11/2003 |

OTHER PUBLICATIONS

Supplementary European Search Report for European Patent Application No. EP04705921, May 2, 2006, (3 pages).

* cited by examiner

IMAGE PROCESSING SYSTEM, INFORMATION PROCESSING DEVICE, AND COMPUTER PROGRAM

CROSS-REFERENCE TO RELATED APPLICATIONS

This application is the national phase under 35 U.S.C. §371 of PCT International Application No. PCT/JP04/000782 which has an International filing date of Jan. 28, 2004 and designated the United States of America.

BACKGROUND OF THE INVENTION

1. Field of the Invention

The present invention relates to an image processing system, an information processing apparatus and a computer program for processing image data with the use of an image processing apparatus having a data protection function.

2. Description of Related Art

In the technology for outputting information processed by an information processing apparatus such as a personal computer (PC), a conventional method of displaying the information as images on an image processing apparatus connected by cables to the information processing apparatuses is now being replaced by a method of transmitting an output instruction over a communication network from the information processing apparatus to the image processing apparatus both are connected with the communication network. As the communication network is connected with two or more information processing apparatuses, one image processing apparatus can be used by those information processing apparatuses. Also, as two or more image processing apparatuses are connected to the communication network, one of them can selectively be used for outputting information.

The information to be handled by the image processing apparatus may often include highly confidential data such as a private company document. However, under the state where two or more information processing apparatuses use one image processing apparatus over the communication network, it may unfairly be intercepted or read out from the image processing apparatus by a number of unauthorized persons and hardly be protected from unintentional leakage. For compensation, an image processing apparatus having a data protection function for ensuring the secrecy of the data such as an image data with use of some techniques of encrypting the information prior to transmit over the communication network or of allowing the information to be outputted only when a user who instructed output of information directly operates the image processing apparatus is proposed. For example, disclosed in Japanese Patent Application Laid-Open No. 2001-306273 is a technology of an image processing apparatus encrypting and storing information received from an information processing apparatus and when a user is authenticated from its entering of a password, allowing the outputting of the information.

Also, in recent image processing apparatuses, some of them have a function for storing the image data which has been outputted for forming as an image. An image processing apparatus for protecting such remained image data from being illegally read out by erasing or rewriting when the image data has been outputted and its process is completed is disclosed in Japanese Patent Application Laid-Open No. 59-50660 (1984).

On the other hand, for outputting the image data to an image processing apparatus, the information processing apparatus has a functions for acquiring information about the image processing apparatus connected over a communication network, outputting the acquired information, accepting selection of the image processing apparatus by an operation of an operator who browses the outputted information, and transmitting an output instruction for instructing output of an image to the image processing apparatus to which the selection is accepted. For the purpose, a technology is disclosed in Japanese Patent Application Laid-Open No. 2000-187564 in which a configuration information about the image processing apparatus involving whether color printing is possible or not, whether printing on both sides of a sheet is possible or not, and which size of printing sheets is used has been acquired in advance and when the image processing apparatus is designated by the user operation on a screen on which information of the image processing apparatuses are displayed, allowing the user to easily recognize the configuration information of the image processing apparatus by outputting the configuration information of the designated image processing apparatus.

As described above, under the environment where two or more image processing apparatuses are connected with the communication network, when no protection of the data is needed, any image processing apparatus which has no data protection function can be selected for outputting an image. However, when the data has to be held in secrecy, an image processing apparatus having the data protection function has to be selected. It is quite difficult to select by view the image processing apparatus having the data protection function. Also, as the information of the image processing apparatus acquired by the conventional information processing apparatus does not include information related to the data protection function, it is difficult to select the proper image processing apparatus when the protection of the information processed by the image processing apparatus is necessary. In fact, problems such that the data protection function can be utilized by some users who exactly understand the condition of the image processing apparatus or even the data needs to be held in secrecy, it may be handled by an image processing apparatus having no data protection function are occurred. As the data protection function of the image processing apparatus is not effectively utilized, the security of the data will be declined.

BRIEF SUMMARY OF THE INVENTION

The present invention has been developed in view of the above aspect and its object is to provide an image processing system, an information processing apparatus and a computer program by which the information processing apparatus acquires information including information indicating whether a data protection function is present or absent from image processing apparatuses, and outputs the acquired information, so that a data protection function of the image processing apparatus can be utilized An image processing system according to the present invention is an image processing system including an information processing apparatus and one or more image processing apparatuses connected to the information processing apparatus for processing an image data received from the information processing apparatus, and is characterized in that the image processing apparatus comprises means for storing protection function information indicating whether a data protection function for protecting an image data to be processed is present or absent, and the information processing apparatus comprises: means for acquiring the protection function information from one or more of the image processing apparatuses connected to itself; and means for outputting the acquired protection function information.

An information processing apparatus according to the present invention is an information processing apparatus, to which one or more image processing apparatuses are connected, for transmitting an image data to the image processing apparatuses and making the image processing apparatuses process the image data, and is characterized by comprising: means for acquiring protection function information, indicating whether a data protection function for protecting an image data to be processed is present or absent, from one or more of the image processing apparatuses connected to itself; and means for outputting the acquiring protection function information.

A computer program according to the present invention is a computer program for causing a computer, to which one or more image processing apparatuses are connected, to transmit an image data to the image processing apparatuses and make the image processing apparatuses process the image data, and is characterized by including: a step of causing the computer to acquire protection function information, indicating whether a data protection function for protecting an image data to be processed is present or absent, from one or more of the image processing apparatuses connected to the computer; and a step of causing the computer to output the acquired protection function information.

According to the present invention, the protection function information whether the data protection function for protecting the image data by encrypting is present or absent is stored in each image processing apparatus, and the information processing apparatus acquires the protection function information from the image processing apparatuses to which the information processing apparatus is connected and outputs the protection function information, so that a user can recognize the information processing apparatus having the data protection function.

A computer program according to the present invention is characterized by further including: a step of causing the computer to acquire intensity information indicting an intensity of data protection of the data protection function from each of the image processing apparatuses having the data protection function; and a step of causing the computer to output the acquired intensity information.

According to the present invention, the information processing apparatus (computer) acquires the intensity information representing an intensity of the data protection by the data protection function and outputs it. This allows the user to easily recognize the degree of data protection by data encrypting by the image processing apparatus.

A computer program according to the present invention is characterized by further including: a step of causing the computer to accept selection of one image processing apparatus from one or more of the image processing apparatuses related to the outputted data protection function; and a step of causing the computer to transmit an image data and a processing instruction of the image data to the image processing apparatus to which the selection is accepted.

According to the present invention, the information processing apparatus accepts selection of one image processing apparatus from one or more image processing apparatuses to which the data protection function is displayed, and causes the image processing apparatus to which the selection is accepted to process an image. This allows the user to select the image processing apparatus after confirming the information of the data protection function.

A computer program according to the present invention is characterized by further including: a step of causing the computer to acquire content information indicating contents of the process executed by the data protection function from the image processing apparatus having the data protection function; and a step of causing the computer to output the acquired content information about the image processing apparatus to which the selection is accepted.

According to the present invention, the information processing apparatus acquires the content information indicating the contents of process executed by the data protection function from the image processing apparatus. This allows the user to recognize the process such as encrypting data or the like executed by the image processing apparatus for protecting the data.

A computer program according to the present invention is characterized by further including: a step of causing the computer to accept a change instruction for changing contents of the process executed by the data protection function about the image processing apparatus to which the selection is accepted; and a step of causing the computer to transmit a processing instruction for instructing the process of the image data with the contents of the process according to the accepted change instruction as the processing instruction.

According to the present invention, the information processing apparatus accepts the change instruction for changing the contents of the process executed by the data protection function, and causes the image processing apparatus to process the image according to the accepted change instruction, so that necessary data protection process is executed.

The above and further objects and features of the invention will more fully be apparent from the following detailed description with accompanying drawings.

DETAILED DESCRIPTION OF THE PRESENT INVENTION

The present invention will be described in detail referring to the relevant drawings of embodiments.

Figure 1:
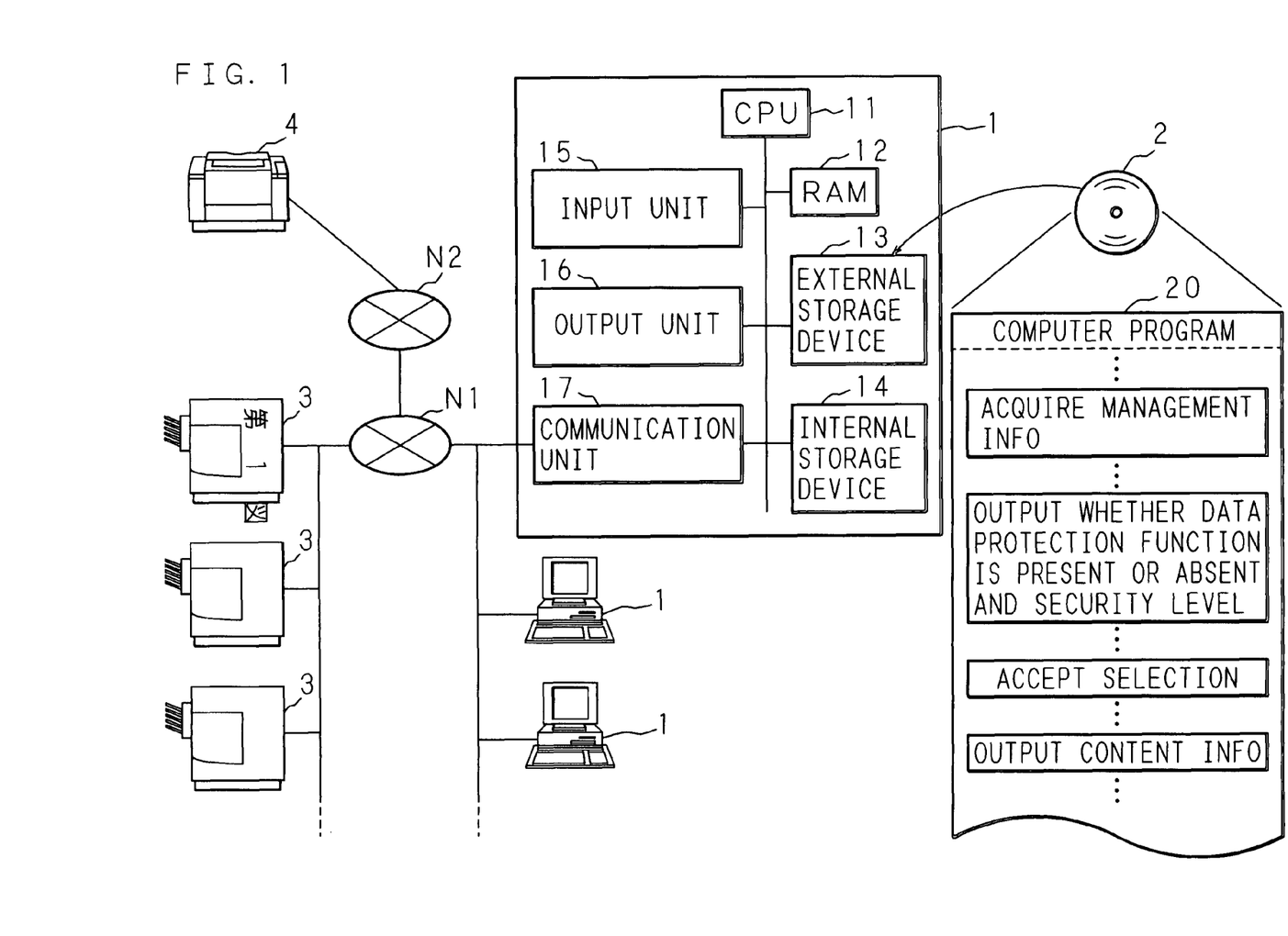
FIG. 1 is a block diagram showing a configuration of an image processing system according to the present.

FIG. 1 is a block diagram showing a configuration of an image processing system according to the present invention. Denoted by 1 in the figures is an information processing apparatus according to the present invention as implemented by a computer. The information processing apparatus 1 comprises a CPU 11 for performing arithmetic operations, a RAM 12 for temporarily storing information generated by the arithmetic operations, an external storage device 13 such as a CD-ROM drive or the like, and an internal storage device 14 such as a hard disk drive or the like. The information processing apparatus 1 reads out from a recording medium 2, such as a CD-ROM, a computer program 20 according to the present invention by the external storage device 13 and loads the computer program 20 in the RAM while storing the computer program 20 in the internal storage device 14. The CPU 11 executes processes necessary for the information processing apparatus 1 according to the loaded computer program 20. The information processing apparatus 1 further comprises an input unit 15 such as a keyboard or a mouse and an output unit 16 such as a liquid crystal display or a CRT display, and is configured to accept operations such as data input from an operator. Moreover, the information processing apparatus 1 comprises a communication unit 17 connected to a communication network N1, such as an external LAN. The CPU 11 exchanges informations over the communication network N1 via the communication unit 17. To the communication network N1, a plurality of information processing apparatuses 1 and a plurality of image processing apparatuses 3 are connected.

Figure 2:
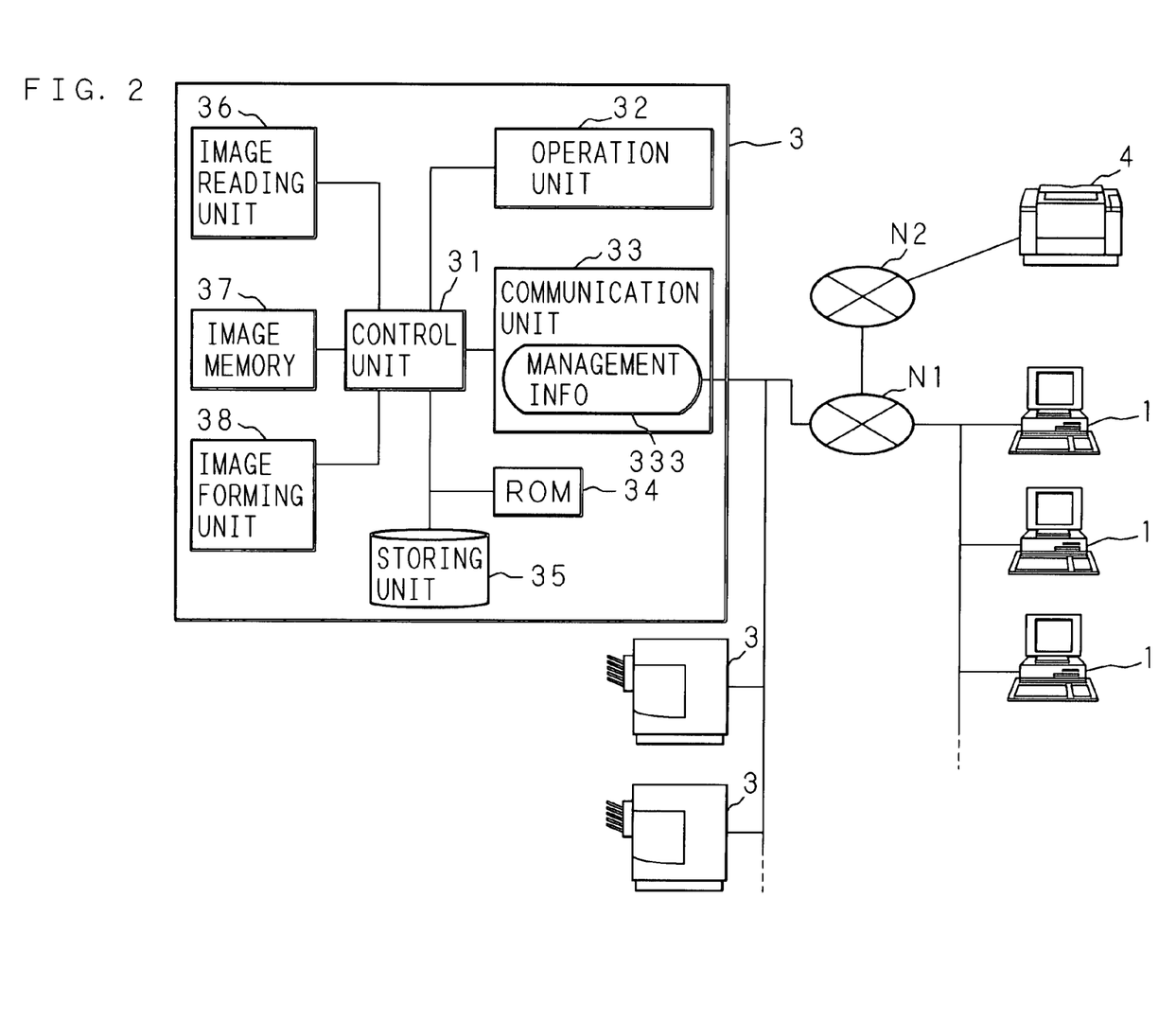
FIG. 2 is a block diagram showing an internal configuration of an image processing.

FIG. 2 is a block diagram showing an internal configuration of the image processing apparatus. The image processing apparatus 3 comprises a control unit 31 which includes a CPU for performing arithmetic operations and a RAM for storing temporary information for the arithmetic operations. To the control unit 31, a ROM 34 in which a control program for controlling the image processing apparatus 3 are stored is connected. The control unit 31 controls whole of the image processing apparatus 3 according to the control program stored in the RAM 34. The control unit 31 is also connected with an image reading unit 36 for reading by scanning an image recorded on a sheet and producing an electronic image data based on the read image, an image memory 37 for temporarily storing the image data, and an image forming unit 38 for forming an image from an image data stored in the image memory 37 and outputting the formed image on a recoding sheet. The image processing apparatus 3 hence functions as a copying apparatus for producing a duplication of the image read by the image reading unit 36. The control unit 31 is connected with a storing unit 35 such as a hard disk drive or a non-volatile memory. The storing unit 35 stores image data. The control unit 31 is connected with an operation unit 32 which accepts operations by a user. The operation unit 32 includes a display unit such as a liquid crystal display or the like for displaying informations for operating the image processing apparatus 3 and an input unit such as a touch panel, a ten-keyboard or the like to which informations such as control commands or the like are inputted by operation of the user.

Moreover, the control unit 31 is connected with a communication unit 33 connected to the communication network N1. The communication unit 33 exchanges informations with the outside over the communication network N1. The communication unit 33 receives an image data transmitted from the information processing apparatus 1 over the communication network N1. The image forming unit 38 can form an image from the image data received by the communication unit 33 and output it. Accordingly, the image processing apparatus 3 functions as a network printer. Also, the image processing apparatus 3 can transmit the image data produced by the image reading unit 36 by reading an image from the communication unit 33 via the communication network N1 to the information processing apparatus 1. Accordingly, the image processing apparatus 3 functions as a network scanner. Also, the communication unit 33 can perform facsimile communication. More particularly, the image processing apparatus 3 can transmit the image data produced by the image reading unit 36 by reading an image from the communication unit 33 via a public switched telephone network (PSTN) N2 connected to the communication network N1 to another facsimile apparatus 4 connected to the public switched telephone network N2. In a reverse, an image data transmitted from the facsimile apparatus 4 over the public switched telephone network N2 by the facsimile communication can be received by the communication unit 33, and the image forming unit 38 can form an image from the image data received by the communication unit 33 and output it. Accordingly, the image processing apparatus 3 functions as a facsimile apparatus.

The storing unit 35 stores the image data outputted from the image forming unit 38 as an output history. Accordingly, when the image data once having been outputted is necessary to again output due to output error or shortage of output number of copies, the control unit 31 again reads necessary image data from the storing unit 35 and forms the image in the image forming unit 38 according to an instruction accepted by the operation unit 32 or an instruction transmitted from the information processing apparatus 1 and received at the communication unit 33. Also, the storing unit 35 can accumulate the image data used for copying, facsimile transmission, image output, and image reading. This allows the user, by an operation of the operation unit 32 or by transmitting a processing instruction from the information processing apparatus 1, to use the image data stored in the storing unit 35 by selecting the image data stored in the storing unit 35 and forming an image in the image forming unit 38 or outputting the image data from the communication unit 33 to the outside. Accordingly, the image processing apparatus 3 functions as a server of the image data.

The foregoing functions of the image processing apparatus 3 are controlled by the control unit 31 according to the control program stored in the ROM 34. Accordingly, the image processing apparatus 3 can be controlled by the control unit 31 according to the control program including a program according to the present invention for realizing the data protection function. By replacing a ROM in which the control program not including the program for realizing the data secrecy function is stored with the ROM 34 in which the control program including the program for realizing the data secrecy function is stored, or according to the control program stored in the ROM 34, by accepting at the operation unit 32 an instruction for activating the data secrecy function, the image processing apparatus 3 can activate the data protection function.

When the data protection function is activating, the control unit 31, according to the control program for realizing the data protection function, encrypts an image data produced by the image reading unit 36 or an image data received by the communication unit 33 and stores it in the storing unit 35 or the image memory 37. When such the image is outputted, the image data having been stored in the image memory 37 is decoded, and an image is outputted at the image forming unit 38. After the completion of outputting the image, the image data stored in the storing unit 35 is erased or overwritten with predetermined data so as to invalidate the image data stored in the storing unit 35. It can also be preset to erase the image data stored in the storing unit 35 whenever the image processing apparatus 3 is powered-on. Even if the image data has been erased, there is a possibility that the image data can be restored from magnetism remaining in the storing unit 35. It can hence be preset to repeat the erasing several times by overwriting of random data. Also, it can further be preset to output the image only when authentication is accepted by an operation of a user at the operation unit 32. By activating the data protection function, the image processing apparatus 3 can keep confidentiality of the information to be handled.

The communication unit 33 has a function of storing information which represents contents of process which can be executed by the image processing apparatus 3 or the size of recording sheets, that is management information 333 indicating the condition of the image processing apparatus 3. The control unit 31 then updates the management information 333 at a predetermined interval by checking the condition of the image processing apparatus 3, including the number of remaining sheets and the occurrence of any error, which may be varied with time. Also, the management information 333 includes a protection function information indicating whether the data protection function is present or absent, an intensity information representing the intensity of data protection by the data protection function, and a content information indicative of contents of the process executed by the data protection function.

Figure 3:
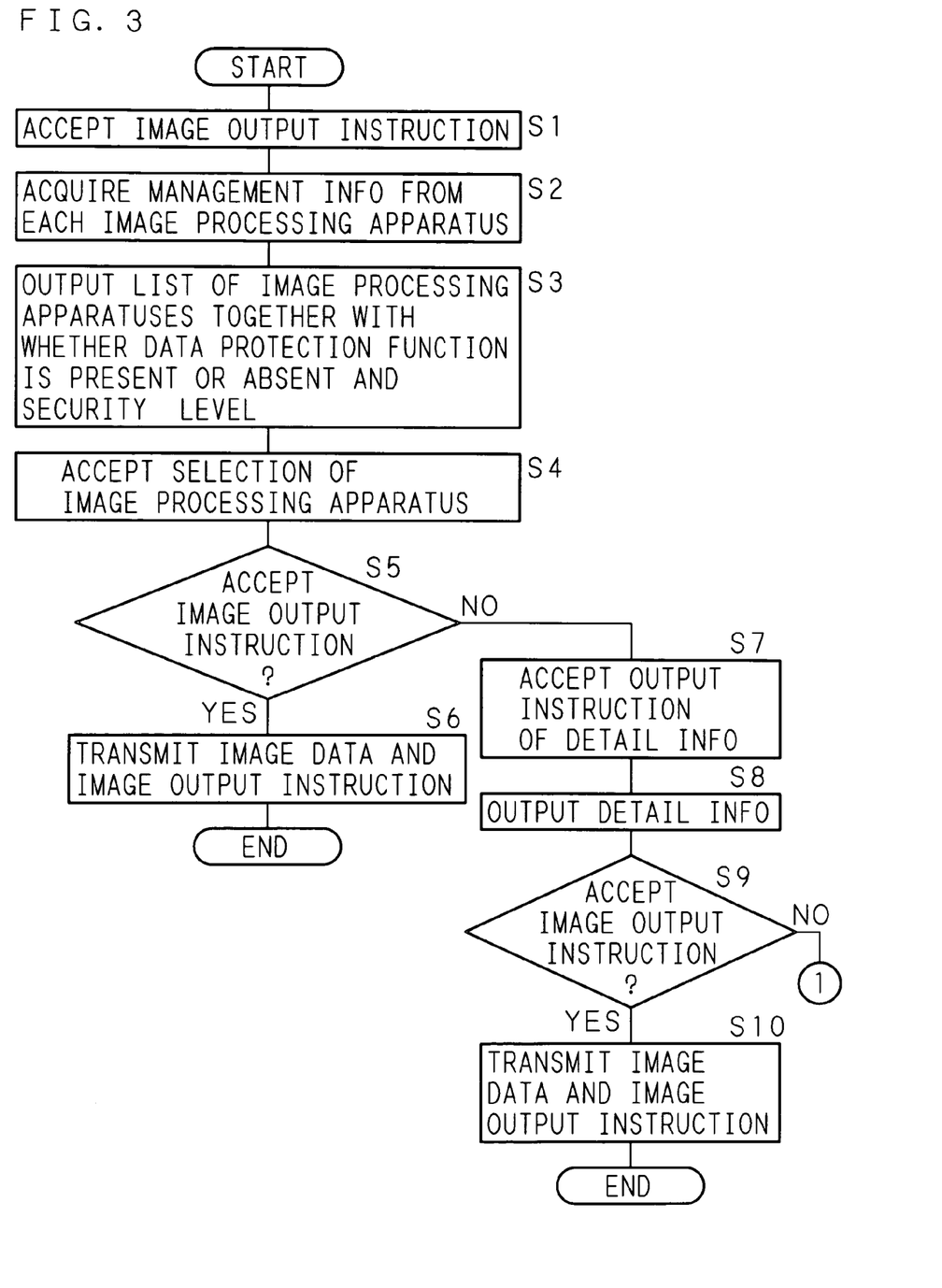
FIG. 3 is a flowchart showing a procedure carried out by an information processing apparatus of the present invention at outputting of the image.
Figure 4:
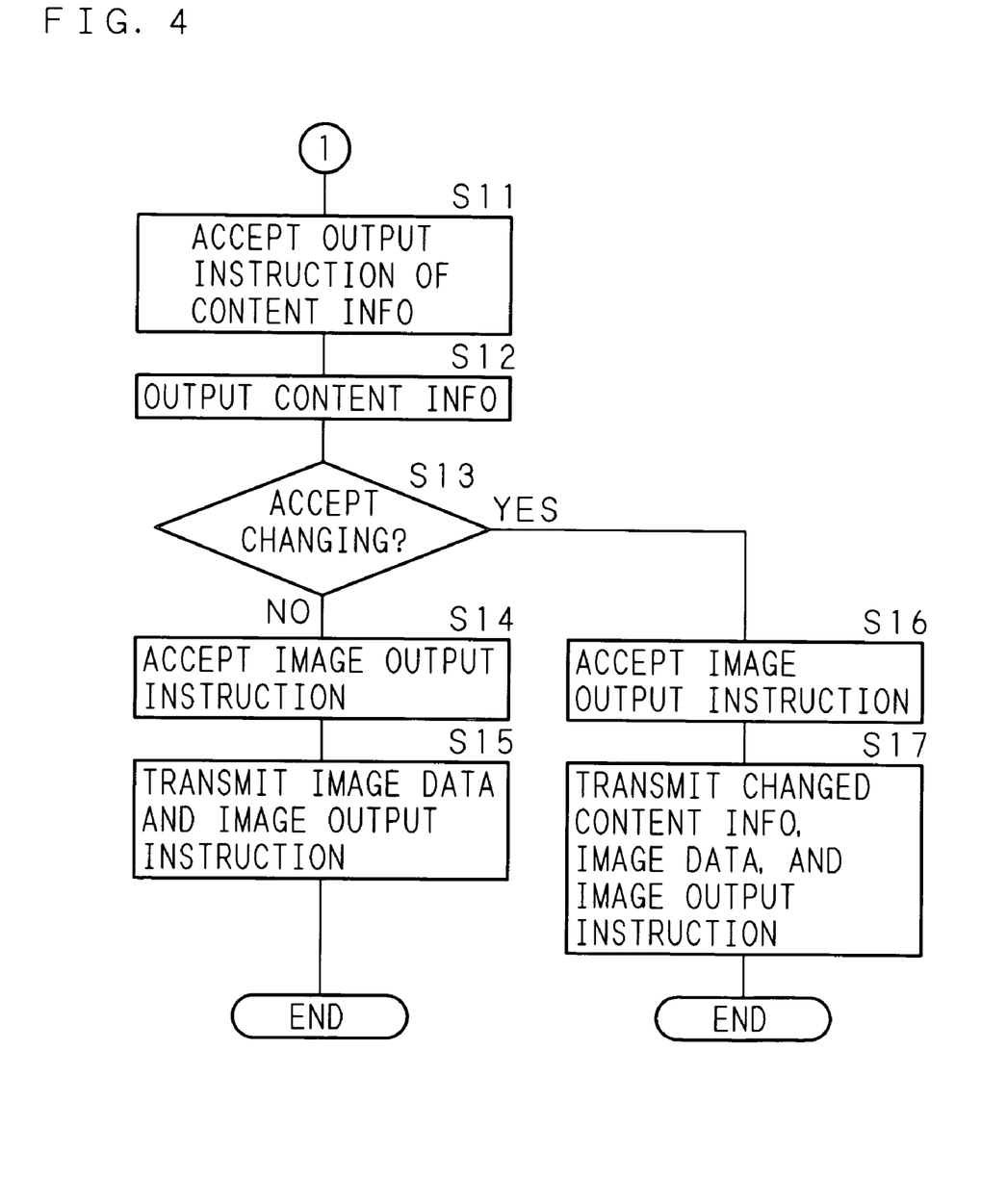
FIG. 4 is a flowchart showing a procedure carried out by an information processing apparatus of the present invention at outputting of the image.

Next, the operation of the above-mentioned image processing system according to the present invention will now be described referring to flowcharts. FIG. 3 and FIG. 4 are flowcharts showing a procedure carried out by the information processing apparatus 1 of the present invention at outputting of the image data. Note that, following procedure is executed by the CPU 11 according to the computer program 20 loaded in the RAM 12. The CPU 11 of the information processing apparatus 1 accepts an image output instruction by operation of the user (S1). Then, the CPU 11 loads the computer program 20 into the RAM 12 and, according to the loaded computer program 20, transmits from the communication unit 17 to each image processing apparatus 3 a transmission request of the management information 333. By receiving the management information 333 at the communication unit 17 transmitted from each image processing apparatus 3, the CPU 11 acquires the management information 333 having been stored in the communication unit 33 of each image processing apparatus 3 (S2). Then the CPU 11 outputs a list of the image processing apparatuses 3 to the display unit 16. In this list, for each image processing apparatus 3, whether the data protection function is present or absent and a security level indicated by a numeral and representing the intensity of data protection by the data protection function are displayed based on the protection function information and intensity information included in the acquired management information 333 (S3).

Figure 5:
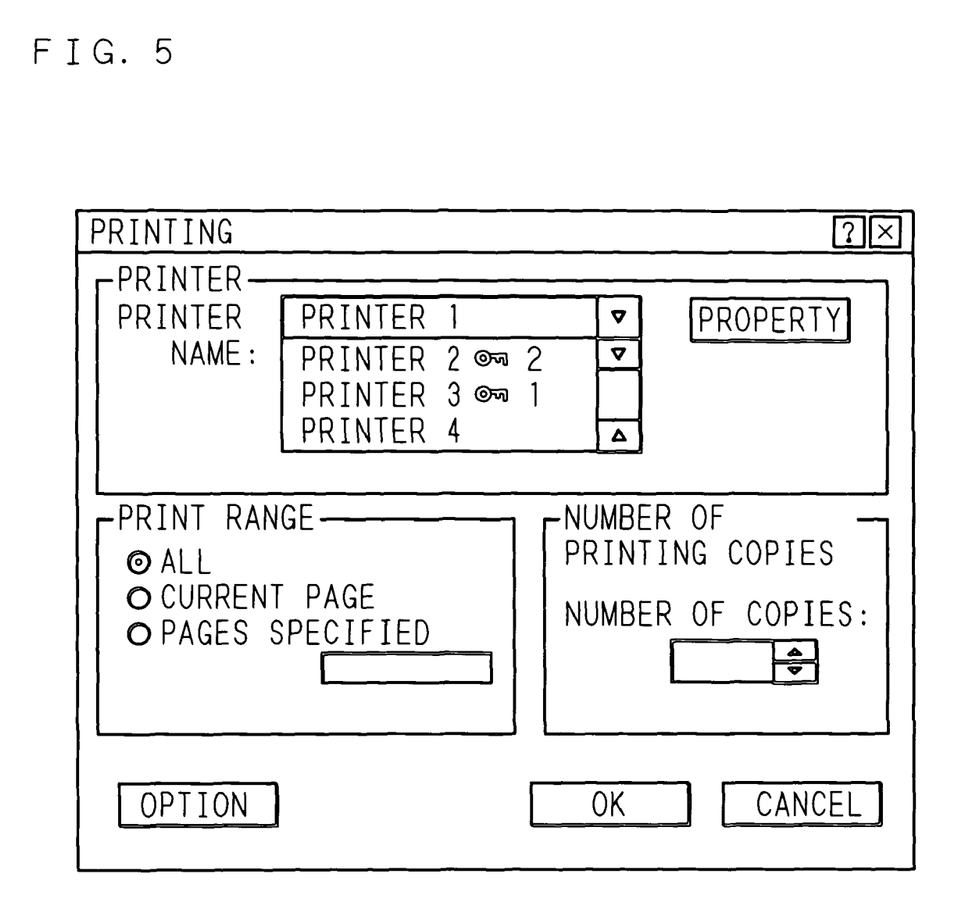
FIG. 5 is a schematic diagram showing a display example of a screen of an output unit of an information processing apparatus outputting a list of an image processing.

FIG. 5 is a schematic diagram showing a display example of a screen of the output unit 16 of the information processing apparatus 1 outputting the list of the image processing apparatuses 3. In the screen, the list of the image processing apparatuses 3 which can be used by being connected over the communication network N1. In the list, when the image processing apparatus 3 has the data protection function, a key mark beside individual name of the image processing apparatus 3 is displayed. When the image processing apparatus 3 has no data protection function, key mark is not displayed. Also, in this screen, when the image processing apparatus 3 has the data protection function, the security level which is indicated by a numeral and represents the intensity of data protection of the data protection function is displayed together with the key mark. More specifically, the intensity of data protection to prevent leakage of the data related to the contents of the process executed by the data protection function is verified by the manufacturer of the image processing apparatus 3 or any verifying party and the verified intensity of the data protection is displayed by a numeral of the security level beside the key mark. The security level represents that larger the numeral, the more the data can be protected.

Figure 6:
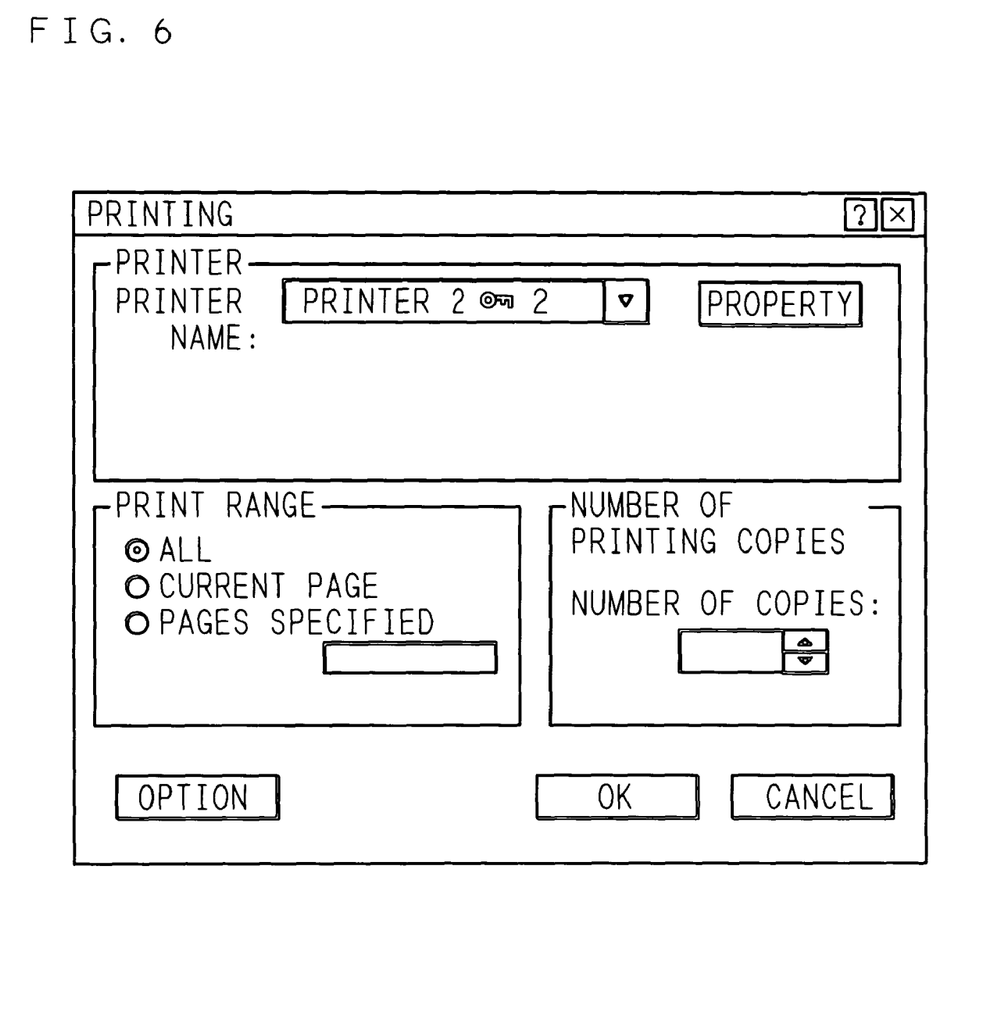
FIG. 6 is a schematic diagram showing a display example of a screen of an output unit of an information processing apparatus when selection of an image processing apparatus is accepted.

By designating one of the image processing apparatuses 3 in the list outputted on the screen of the output unit 16 of the information processing apparatus 1, the CPU 11 accepts selection of the image processing apparatus 3 used for outputting an image data (S4). FIG. 6 is a schematic diagram showing a display example of a screen of the output unit 16 of the information processing apparatus 1 when selection of the image processing apparatus 3 is accepted. In this screen, the name of the selected image processing apparatus 3 is displayed, and that image data can be outputted with use of the selected image processing apparatus 3 is indicated. Next, the CPU 11 of the information processing apparatus 1 monitors acceptance of an image output instruction by operation of the user, e.g., selecting of output OK, on the screen shown in FIG. 6 (S5). When the image output instruction is accepted (YES in S5), the CPU 11 transmits an image data together with the image output instruction for outputting the transmitted image data as the image to the selected image processing apparatus 3 (S6), and then terminates the procedure.

When the image output instruction is not accepted (NO in S5), the CPU 11, then, accepts an output instruction of the detail information of the selected image processing apparatus 3 by operation of the user, e.g., designating property, on the screen shown in FIG. 6 (S7). In turn, the CPU 11, according to the computer program 20 loaded at the RAM 12, outputs the detail information showing the condition of the image processing apparatus 3 to the output unit 16 according to the management information 333 acquired from the selected image processing apparatus 3 (S8).

Figure 7:
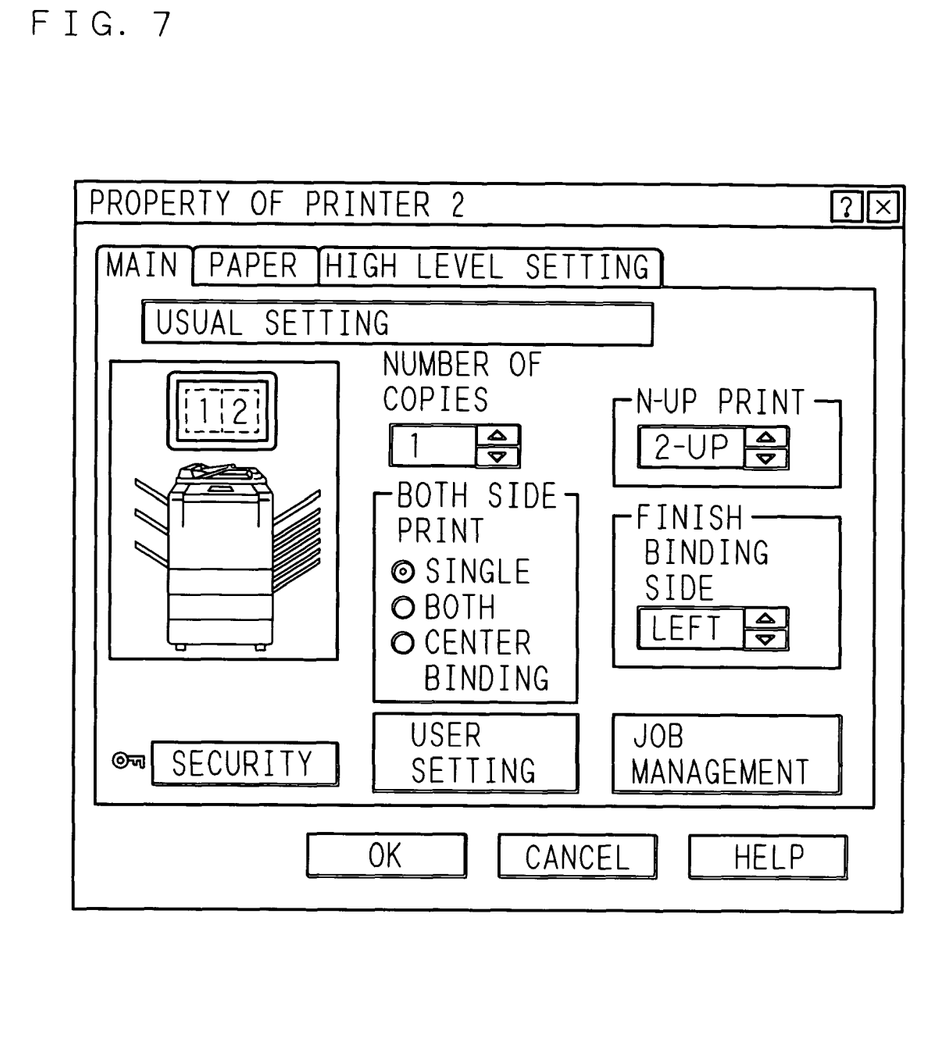
FIG. 7 is a schematic diagram showing a display example of a screen of an output unit of an information processing apparatus when detail information about an image processing apparatus is outputted.

FIG. 7 is a schematic diagram showing a display example of a screen of the output unit 16 of the information processing apparatus 1 when detail information about the image processing apparatus 3 is outputted. In this screen, the contents of the process set to be executed by the image processing apparatus 3 is displayed, and it is possible to instruct output of an image by changing setting if necessary. Also, it is possible to confirm the information related to the data protection function by designating the security on the screen.

Next, the CPU 11 monitors the acceptance of image output instruction by operation of the user, e.g., selecting output OK, on the screen shown in FIG. 7 (S9). When the image output instruction is accepted (YES in S9), the CPU 11 transmits an image data together with the image output instruction for outputting the transmitted image data as the image to the selected image processing apparatus 3 (S10), and then terminates the procedure.

Figure 8:
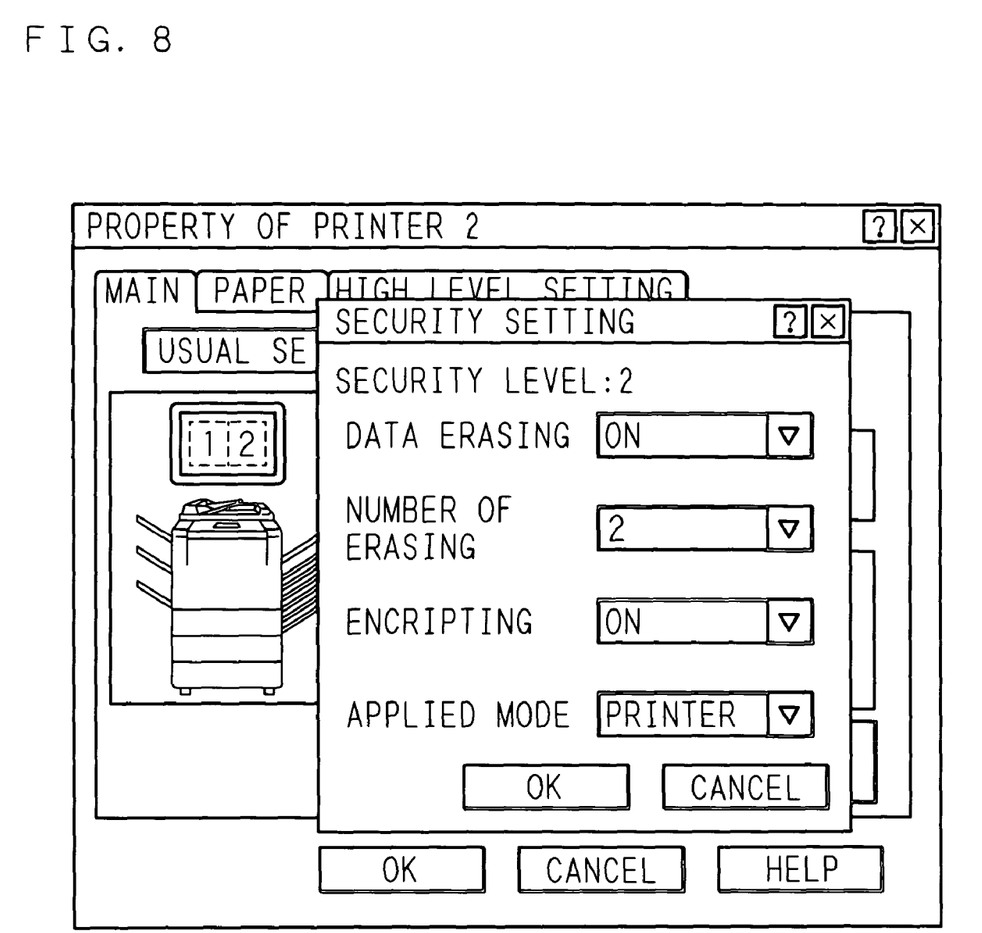
FIG. 8 is a schematic diagram showing a display example of a screen of an output unit of an information processing apparatus when content information is outputted.

When the image output instruction is not accepted (NO in S9), the CPU 11, then, accepts an output instruction of the content information indicating the contents of the process executed by the data protection function of the selected image processing apparatus 3 by operation of the user, e.g., designating security, on the screen shown in FIG. 7 (S11). In turn, the CPU 11 outputs to the output unit 16 the content information indicating the contents of the process executed by the data protection function of the image processing apparatus 3 (S12) according to the management information 333 acquired from the selected image processing apparatus 3, FIG. 8 is a schematic diagram showing a display example of a screen of the output unit 16 of the information processing apparatus 1 when the content information is outputted. In this screen, the contents of the process executed by the data protection function such as whether or not data erasing is carried out after the process of the image data, the number of erasing for erasing the data, and whether or not the data is encrypted when storing are displayed. Also, the security level as sama as the output in step S3 is displayed. Moreover, it is possible to change the contents of the process by the user operation.

The CPU 11 then monitors acceptance of changing the contents of the process executed by the data protection function (S13). When changing is not accepted (NO in S13), the CPU 11 accepts the image output instruction by the user operation (S14), and transmits an image data together with the image output instruction for outputting the transmitted image data as the image to the selected image processing apparatus 3 (S15), and then terminates the procedure. When, in step S13, changing of the contents of the process of the data protection function is accepted (YES in S13), the CPU 11 accepts the image output instruction by the user operation (S16), and, then, transmits the image output instruction for processing an image data by changed content information, image data, and the contents of the process of the data protection function and for outputting as the image (S17), and terminates the procedure.

Note that, in the above-described procedure, the process in which the data protection function is used at executing the process for outputting the image at the image processing apparatus 3 is described, but are not of limitation. For example, in another process which can be executed by the image processing apparatus 3 such as transmitting the image data to another facsimile apparatus 4 over a facsimile communications may employ the same process for using the data protection function.

As described above, in the present invention, the information processing apparatus 1 acquires the information about the data protection function of the image processing apparatuses 3 connected to the communication network N1, and by outputting the acquired information, accepts the selection of the image processing apparatus 3 used for processing the image data. Also, the information processing apparatus 1, by acquiring from each of the image processing apparatuses 3 the information whether the data protection function is present or absent, displays a list of the image processing apparatuses 3 with or without the data protection function on the screen, and, from the displayed list, accepts selection of one of the image processing apparatuses 3 by which process for the image data is executed. Accordingly, since the user can easily recognize the image processing apparatuses 3 having the data protection function by the information processing apparatus 1, when the image data to be processed by the image processing apparatus 3 has to be held in secrecy, the user can readily select the image processing apparatus 3 having the data protection function. As a result, the data protection function of the image processing apparatus 3 can be used by all the user, and the image processing apparatus 3 having no data protection function will hardly be selected by the user who wants to process the image data with the data protection function. Accordingly, the data protection function of the image processing apparatus 3 can be utilized at higher effectiveness, contributing to the improvement of the data protection.

In addition, the information processing apparatus 1 of the present invention acquires the intensity information representing the intensity of data protection together with the information whether the data protection function is present or absent and displays the security level showing the intensity information as a numeral. Accordingly, the user can easily recognize the degree of data protection of the image processing apparatus 3 when selecting the image processing apparatus 3 with the use of the information processing apparatus 1, and the user can select the image processing apparatus 3 having the most preferable intensity of data protection. The information processing apparatus 1 of the present invention also acquires and outputs the content information representing the contents of the process executed by the data protection function. Accordingly, the user can confirm that the image processing apparatus 3 protects data by executing which process to which degree with the use of the information processing apparatus 1. Further, since it is possible to process the data by changing the contents of the process executed by the data protection function through the information processing apparatus 1 so that the data protection function of the image processing apparatus 3 is utilized according to necessary contents of process.

INDUSTRIAL APPLICABILITY

According to the present invention, the image processing apparatus stores the protection function information whether the data protection function for protecting the image data by encrypting the data or the like is present or absent, and the information processing apparatus acquires the protection function information from the image processing apparatuses which are connected to the information processing apparatus and output it. As a result, the user can easily recognize the image processing apparatus having the data protection function.

According to the present invention, the information processing apparatus acquires the intensity information representing the intensity of data protection by the data protection function from the image processing apparatus and outputs it. As a result, the user can easily recognizes the degree of data protection by the image processing apparatus.

According to the present invention, the information processing apparatus accepts the selection of one image processing apparatus from one or more image processing apparatuses to which the protection function information is displayed, and makes the image processing apparatus which is accepted selection process the data. This allows the user to readily select the image processing apparatus having the data protection function and use it when the information to be processed has to be held in secrecy. As a result, the data protection function of the image processing apparatus can be utilized at optimum intensity thus improving security of the information.

According to the present invention, the information processing apparatus acquires the content information indicating the contents of the process executed by the data protection function and outputs it. As a result, the user can easily confirm that the image processing apparatus protects data by executing which process to which degree.

Further, according to the present invention, the information processing apparatus accepts change instruction for changing the contents of the process executed by the data protection function, and makes the image processing apparatus process the image. As a result, the user can use the data protection function of the image processing apparatus at a necessary contents of process.

As this invention may be embodied in several forms without departing from the spirit of essential characteristics thereof, the present embodiments are therefore illustrative and not restrictive, since the scope of the invention is and all changes that fall within metes and bounds of the claims, or equivalence of such meters and bounds thereof are therefore intended to be embraced by the claims.

The invention claimed is:

1. An image processing system including a computer and a plurality of image processing apparatuses connected via a communication network to said computer for processing an image data received from said computer, wherein said computer is adapted and configured to select an image processing apparatus that receives and processes said image data, among said plurality of image processing apparatuses;

said image processing apparatus comprises a protection function information storing unit for storing protection function information indicating whether a data protection function for protecting a data to be processed is present or absent in said image processing apparatus, and said computer comprises:
  a protection function information acquiring unit for acquiring the protection function information from said plurality of image processing apparatuses connected to itself; and
  an output unit for outputting a list of data protection function based on the protection function information acquired by said protection function information acquiring unit, wherein the list synoptically represents what data protection function is present or absent in each of said one or more image processing apparatuses.

2. The image processing system as set forth in claim 1, wherein
said protection function information acquiring unit acquires intensity information indicating an intensity of data protection of the data protection function from the protection function information storing unit of each of said plurality of image processing apparatuses having the data protection function; and
said output unit outputs the intensity information acquired by said protection function information acquiring unit.

3. The image processing system as set forth in claim 2, wherein said computer further comprises:
an input unit for accepting selection of one image processing apparatus from said plurality of image processing apparatuses related to the protection function information outputted by said output unit; and
a communication unit for transmitting an image data and a processing instruction of said image data to the image processing apparatus to which the selection is accepted.

4. The image processing system as set forth in claim 3, wherein
said protection function information acquiring unit acquires content information indicating contents of the process executed by the data protection function from said protection function information storing unit of said image processing apparatus having the data protection function; and
said output unit outputs the content information acquired by said protection function information acquiring unit about the image processing apparatus to which the selection is accepted.

5. The image processing system as set forth in claim 4, wherein
said input unit further accepts a change instruction for changing contents of the process executed by the data protection function about the image processing apparatus to which the selection is accepted; and
said communication unit transmits, to the image processing apparatus to which the selection is accepted, a processing instruction as said processing instruction for instructing that the image data is processed by the contents of the process according to the change instruction accepted by said input unit.

6. A computer, to which a plurality of image processing apparatuses are connected via a communication network, for transmitting an image data to said plurality of image processing apparatuses and making said plurality of image processing apparatuses process the image data, comprising:
said computer being adapted and configured to select an image processing apparatus that receives and processes said image data, among said plurality of image processing apparatuses;
a protection function information acquiring unit for acquiring protection function information, indicating whether a data protection function for protecting a data to be processed is present or absent in said image processing apparatus, from said plurality of image processing apparatuses connected to itself; and
an output unit for outputting a list of data protection function based on the protection function information acquired by said protection function information acquiring unit, wherein the list synoptically represents what data protection function is present or absent in each of said one or more image processing apparatuses.

7. The computer as set forth in claim 6, wherein
said protection function information acquiring unit acquires intensity information indicting an intensity of data protection of the data protection function from each of said plurality of image processing apparatuses having the data protection function; and
said output unit outputs the intensity information acquired by said protection function information acquiring unit.

8. The computer as set forth in claim 7, further comprising:
an input unit for accepting selection of one image processing apparatus from said plurality of image processing apparatuses related to the protection function information outputted by said output unit; and
a communication unit for transmitting an image data and a processing instruction of said image data to the image processing apparatus to which the selection is accepted.

9. The computer as set forth in claim 8, wherein
said protection function information acquiring unit acquires content information indicating contents of the process executed by the data protection function from said image processing apparatus having the data protection function; and
said output unit outputs the content information acquired by said protection function information acquiring unit about the image processing apparatus to which the selection is accepted.

10. The computer as set forth in claim 9, wherein
said input unit further accepts a change instruction for changing contents of the process executed by the data protection function about the image processing apparatus to which the selection is accepted; and
said communication unit transmits a processing instruction as said processing instruction for instructing that the image data is processed by the contents of the process according to the change instruction accepted by said input unit.

11. A computer program product for controlling a computer, to which a plurality of image processing apparatuses are connected via a communication network, to transmit an image data to said plurality of image processing apparatuses and make said plurality of image processing apparatuses process the image data, wherein the computer program product comprises:
a computer adapted and configured to select an image processing apparatus that received and processes said image data, among said plurality of image processing apparatuses;

a non-transitory computer readable storage medium having computer readable program code means embodied in said medium, said computer readable program code means comprising computer instruction means for:

acquiring protection function information, indicating whether a data protection function for protecting an image data to be processed is present or absent in said image processing apparatus, from said plurality of image processing apparatuses connected to the computer; and outputting a list of data protection function based on the acquired protection function information, wherein the list synoptically represents what data protection function is present or absent in each of said one or more image processing apparatuses.

12. The computer program product as set forth in claim 11, wherein said computer readable program code means further comprises computer instruction means for:

acquiring intensity information indicting an intensity of data protection of the data protection function from each of said image processing apparatuses in which the data protection function is present; and outputting the acquired intensity information.

13. The computer program product as set forth in claim 12, wherein said computer readable program code means further comprises computer instruction means for:

accepting selection of one image processing apparatus from said plurality of image processing apparatuses related to the outputted protection function information; and transmitting an image data and a processing instruction of said image data to the image processing apparatus to which the selection is accepted.

14. The computer program product as set forth in claim 13, wherein said computer readable program code means further comprises computer instruction means for:

acquiring content information indicating contents of the process executed by the data protection function from said image processing apparatus having the data protection function; and outputting the acquired content information about the image processing apparatus to which the selection is accepted.

15. The computer program product as set forth in claim 14, wherein said computer readable program code means further comprises computer instruction means for:

accepting a change instruction for changing contents of the process executed by the data protection function about the image processing apparatus to which the selection is accepted; and transmitting a processing instruction for instructing the process of the image data with the contents of the process according to the accepted change instruction as said processing instruction.

* * * * *